United States Patent [19]
Leung

[11] Patent Number: 5,785,531
[45] Date of Patent: Jul. 28, 1998

[54] CUTTABLE PAPILLA AND SPHINCTEROTOMY TRAINING APPARATUS

[75] Inventor: Joseph Wing-cheong Leung, Davis, Calif.

[73] Assignee: Wilson-Cook Medical Incorporated, Winston-Salem, N.C.

[21] Appl. No.: 660,037

[22] Filed: Jun. 6, 1996

[51] Int. Cl.$^6$ ............................................. G09B 23/28
[52] U.S. Cl. ........................ 434/262; 434/267; 434/272
[58] Field of Search .............................. 434/262, 267, 434/268, 269, 270, 271, 272, 273

[56] References Cited

U.S. PATENT DOCUMENTS

| | | | |
|---|---|---|---|
| 4,481,001 | 11/1984 | Graham et al. | 434/267 |
| 4,596,528 | 6/1986 | Lewis et al. | 434/270 |
| 4,865,551 | 9/1989 | Maloney et al. | |
| 4,865,552 | 9/1989 | Maloney et al. | |
| 4,867,686 | 9/1989 | Goldstein | |
| 4,938,696 | 7/1990 | Foster et al. | |
| 5,024,617 | 6/1991 | Karpiel | |
| 5,104,328 | 4/1992 | Lounsbury | |
| 5,336,708 | 8/1994 | Chen | 524/474 |
| 5,368,487 | 11/1994 | Medina | 434/262 |
| 5,403,191 | 4/1995 | Tuason | 434/262 |
| 5,425,644 | 6/1995 | Szinicz | 434/268 |
| 5,518,406 | 5/1996 | Waters | 434/267 |
| 5,518,407 | 5/1996 | Greenfield et al. | 434/272 |
| 5,620,326 | 4/1997 | Younker | 434/268 |

*Primary Examiner*—Richard J. Apley
*Assistant Examiner*—John Edmund Rovnak
*Attorney, Agent, or Firm*—Richard J. Godlewski

[57] ABSTRACT

An apparatus 10 for training a physician in performing surgery, such as performing a sphincterotomy or papillotomy, includes a model of the human or animal tissue in which a sphincter is located, the model being cuttable by an electrosurgical tool 28 such as a sphincterotome or papillotome. More particularly, the apparatus 10 first includes a porous, nonconductive form 12 having mechanical properties comparable to those of human or animal tissue in which a sphincter is located. The apparatus 10 also includes an electroconductive gel, such as conventional electrocardiogram gel, disposed in the porous form in an amount adequate to permit cutting of the form 12 by an electrosurgical tool 28, such as a sphincterotome or papillotome. The form 12 preferably has a plurality of pores 14 formed in it. More preferably, the form 12 can be an open-cell foam of polyurethane or another synthetic elastomer, although the form 12 can also be composed of a fabric. In this latter case the pores 14 can be formed in the threads of the fabric, so that the gel 16 is absorbed into the threads themselves, or can be formed as the open spaces between the fibers of a woven or nonwoven fabric, mesh, web or felt. The electroconductive gel 16 is preferably a conventional electrocardiogram gel, based on a salt disposed in an aqueous jelly, although soap solution-based gels may also be useful. The apparatus 10 also preferably includes a stand 34 for establishing the position of the form 12 and restricting movement of the electrosurgical tool 28; this permits the apparatus 10 to mimic the manipulations which would be needed when the electrosurgical tool 28 is actually positioned within the body of the patient.

15 Claims, 2 Drawing Sheets

CUTTABLE PAPILLA AND SPHINCTEROTOMY TRAINING APPARATUS

TECHNICAL FIELD

This invention relates generally to medical devices, and more particularly to devices for training medical practitioners in the performance of surgical techniques.

BACKGROUND OF THE INVENTION

A variety of devices are known for performing surgical cutting at a site inside a patient. Such devices are employed with an endoscope for viewing the surgical site, thereby avoiding any exposure of the site to the outside. In an endoscopic sphincterotomy, for example, an electrosurgical tool (such as a sphincterotome or papillotome) is used in conjunction with an endoscope to surgically cut the tissue forming a sphincter within the patient. One sphincter commonly cut by endoscopic sphincterotomy is the sphincter of Oddi, which is formed in the papilla of Vater and which opens into the duodenum. The sphincter of Oddi communicates with the ampulla of Vater, the common channel into which the biliary duct (common bile duct) and the pancreatic duct merge. Such a sphincterotomy, in this particular case, a papillotomy, entails the use of a papillotome to cut open the papilla of Vater and allow the performance of other treatments. Typical of these treatments is the removal of gallstones obstructing the biliary duct.

A very useful sphincterotome (a papillotome) and surgical methods of its use are disclosed in U.S. Pat. No. 5,024,617 (J. Karpiel, Jun. 18, 1991). The entire disclosure of that patent is expressly incorporated by reference herein. The specification of the patent notes that a survey conducted by the American Society for Gastrointestinal Endoscopy revealed that the most common major complication from endoscopic sphincterotomy was bleeding. The specification of the patent further notes that the vast majority of such bleeding typically results when the retroduodenal artery is cut. Other major complications include pancreatitis, perforation and cholangitis.

The sphincterotomy device disclosed in the '617 patent is intended to enhance the control a physician has while performing a sphincterotomy, so as to reduce the risk of inadvertent or uncontrolled cuts during the sphincterotomy, and thereby reduce the risk of injury to the patient during the procedure. The device disclosed in the patent appears to achieve this reduction in risk admirably. However, it would seem that the risks inherent in the performance of a sphincterotomy or papillotomy with this or any other electrosurgical tool could be reduced even further, if a satisfactory way was discovered to allow a physician surgeon, more particularly, a gastroenterologist to practice using the electrosurgical tool before actually using it on a patient. Such practice would make the physician more familiar with the degree of force necessary to advance the tool through the tissue to be cut, with the degree of force necessary to actually perform the cutting of the tissue, and with the tissue cutting rates and volumes usually obtained during cutting. This could only improve the physician's ability to control the tool during the surgical procedure, and thereby reduce the risk of injury or complication to the patient during such surgery.

Unfortunately, at present there appear to be no inexpensive models of sphincter tissue which would permit a physician to practice sphincterotomy or papillotomy techniques. The practice of such techniques instead presently requires a living volunteer or patient including animals, or a corpse donated for the purpose of medical research. Neither alternative provides a sufficient opportunity for the volume of training that might be desired. It also appears that plastic or other synthetic models of sphincter tissue are not in use at this time for such training. Indeed, it would seem that those skilled in the surgical arts would find conventional models of sphincter tissue to be unsuited for use as replacements of actual tissue, since the cutting of plastics and other nonconductive synthetic materials with electrosurgical tools would be expected to require currents far in excess of the currents conventionally employed in cutting actual tissue, and perhaps well in excess of the currents which can be carried by the tools.

SUMMARY OF THE INVENTION

The foregoing problems are solved and a technical advance is achieved in an illustrative cuttable papilla and apparatus for training physicians in the use of electrosurgical tools, such as sphincterotomes and papillotomes. Applicant has discovered an inexpensive model for the human and animal tissues in which sphincters are formed. The model is thus advantageous in that it obviates the costs and limitations incurred when actual tissues are employed in training physicians in the use of electrosurgical tools, in particular, sphincterotomes and papillotomes.

More particularly, applicant has discovered that the key to making a model of tissue useful with electrosurgical tools is to prepare a form which is porous, and then infuse the form with a conductive material, in particular, with an electroconductive gel. The gel permits the electrosurgical tool to be used in its conventional fashion to cut the infused form. The resulting apparatus, an imitation of actual tissue, is much less expensive to use for training than is actual tissue. This increases both the number of physicians who can be trained, and the number of times a physician may practice a technique, at a given cost. Physicians are thereby able to gain valuable experience and ultimately can perform the sphincterotomy, papillotomy or other procedure with a lesser amount of risk to the patient.

In a first aspect, then, the present invention is directed to a surgical training apparatus comprising a porous, nonconductive form having mechanical properties comparable to the mechanical properties of human or animal tissue in which a sphincter is located; and an electroconductive gel disposed in the porous form in an amount adequate to permit cutting of the form by an electrosurgical tool. Preferably, the form is an open cell foam possessing a plurality of pores in which the gel is disposed. Also preferably, the form has mechanical properties comparable to the papilla of Vater, and comprises an orifice defined therein, the orifice being dimensioned comparable to (and thereby being representative of) the sphincter of Oddi, or other sphincter to be cut. The apparatus can further comprise the electrosurgical tool itself, such as a sphincterotome or papillotome, as well as a stand establishing the position of the form and restricting movement of the electrosurgical tool, thereby providing a more realistic simulation of the conditions under which the electrosurgical tool will be used in a patient. The form and, more particularly, the foam and electroconductive gel also advantageously simulates the feel and conditions that the physician will encounter with a patient.

In a second aspect, the present invention is directed to a specific combination of the preferred elements described above.

In a final aspect, the present invention is directed to a method of surgical training comprising the steps of providing the porous form, electroconductive gel and electrosurgical tool described above, and cutting the form with the electrosurgical tool.

Again, the present invention is particularly advantageous in that it provides an inexpensive model, mechanically comparable to actual tissue, for practicing electrosurgical procedures. Training performed with the present invention does not require living volunteers or patients, nor corpses donated for medical research. Increased practice of such methods before they are actually employed on a patient cannot help but to reduce the risk of injury to the patient from the performance of such procedures. The discovery of improvements to the steps involved in such procedures should also be facilitated by increased training and practice in such procedures.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which.

DETAILED DESCRIPTION

Figure 1:
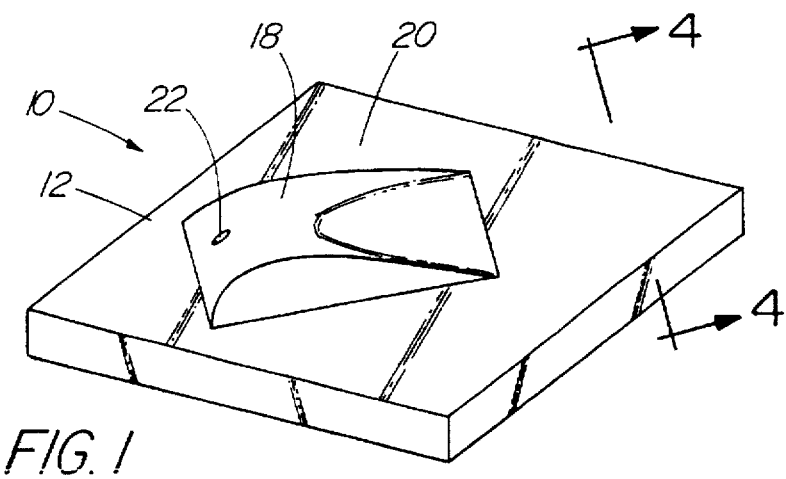
FIG. 1 is a perspective view of the preferred embodiment of the present invention.
Figure 4:
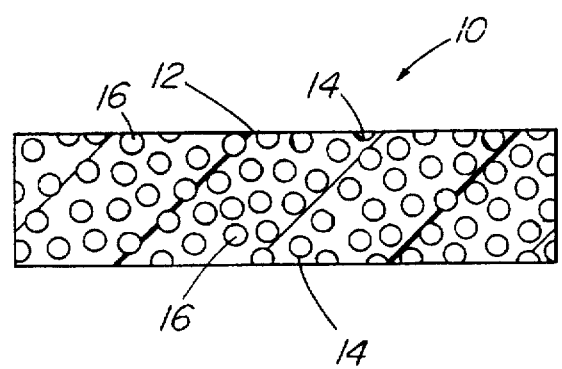
FIG. 4 is a cross-sectional view taken along line 4—4 of FIG. 1.
Figure 2:
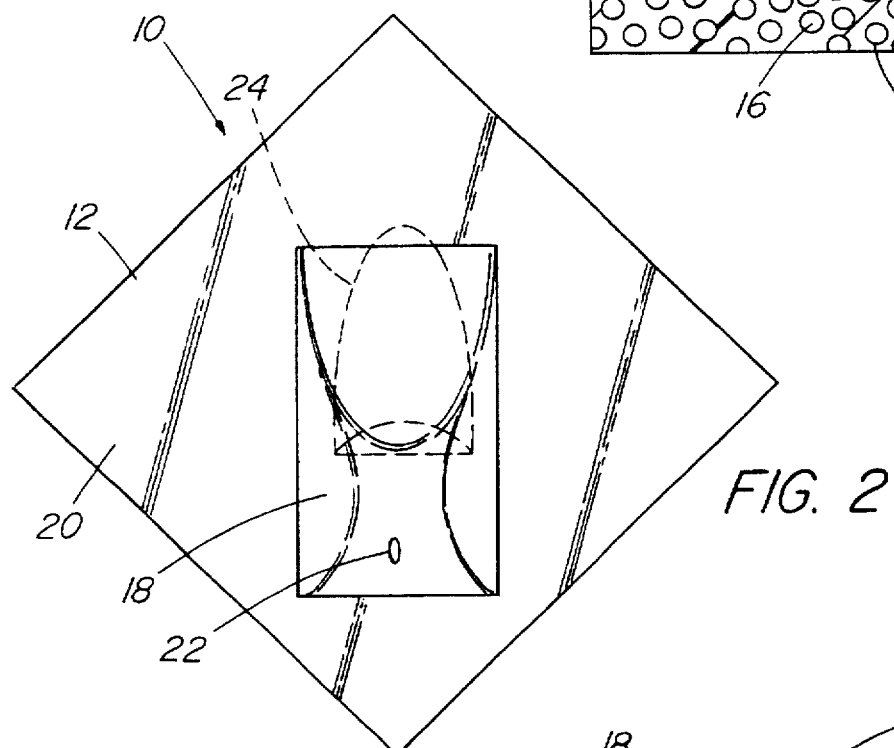
FIG. 2 is a top view of the preferred embodiment of the present invention.
Figure 3:
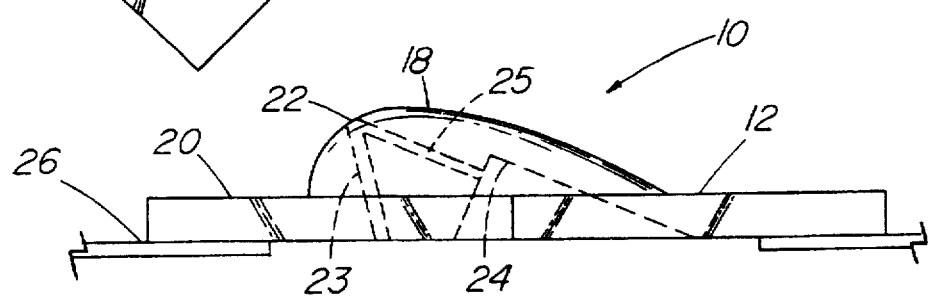
FIG. 3 is a side view of the preferred embodiment of the present invention.

With reference first to FIGS. 1 through 4, an apparatus 10 for training physicians in the use of an electrosurgical tool (such as a sphincterotome or papillotome) is thereshown, first comprising a porous, nonconductive form 12 of an open celled foam, and an electroconductive gel 16 disposed in the porous form 12, in an amount adequate to permit cutting of the form 12 by an electrosurgical tool 28 (for example, of the type disclosed in the '617 patent, incorporated by reference herein). The form 12 has mechanical properties comparable to the mechanical properties of human or animal tissue, preferably tissue in which a sphincter is located. The particular mechanical property of concern is the resilient resistance of the tissue to cutting by and advancement of the electrosurgical tool 28. The determination as to whether the composition of one particular form 12 or another is such as to give the form 12 suitable mechanical properties is not readily subject to objective quantification; it is, rather, a matter of feel and experience. However, those skilled in the art of training physicians in the use of electrosurgical tools, once having read the present application, should easily be able to determine such suitability.

The shape of the form 12 is not believed to be critical to the utility of the apparatus 10 as a training device. However, since training in any surgical technique may be improved when the physician's attention is drawn to specific tissues which are to be treated by such technique, it is preferred that the form 12 mimics a particular sphincter to be cut. It is particularly preferred that the form 12 is shaped comparable to and has mechanical properties comparable to the papilla of Vater, in which the sphincter of Oddi is formed. Accordingly, the form 12 can comprise a projection 18 mimicking the papilla of Vater, extending from a generally planar portion 20. The form 12 can further comprise an orifice 22 in the projection 18, angled and dimensioned comparable to, and thereby representative of, the sphincter of Oddi. Orifice 22 is that of pancreatic duct 23 and bileduct 25. A hollow 24 can be provided in the planar portion 20 opposite the projection 18, to make the form 12 even more similar to the tissues in the vicinity of the sphincter of Oddi. Of course, the form 12 can be shaped to simulate a variety of other bodily structures and/or apertures, without detracting from the utility of the apparatus 10 as a training device.

As indicated, the form 12 is porous, that is, it has a plurality of pores 14 in it. "Porous" is used in its broadest sense, meaning that the form 12 is capable in some way or manner of containing the electroconductive gel 16 within it so as to make the form 12 cuttable by the electrosurgical tool 28. Accordingly, the pores 14 in the form 12 can be provided in any of a variety of ways, and the electroconductive gel 16 disposed in the pores 14. The form 12 can be composed of one or more layers of a fabric, and the pores 14 located in individual absorbent fibers of the fabric. Alternatively, the form 12 can be composed of one or more layers of a mesh, web, felt, batting, or woven or nonwoven fabric, or any combination of these, the pores 14 then being formed as the open spaces between the individual fibers making up the mesh, web, felt, batting or fabric. The individual fibers can be absorbent or nonabsorbent.

Most preferably, however, the form 12 is composed of an open-celled foam in which the plurality of pores 14 are connected to one another. The foam making up the form 12 is preferably composed of a synthetic elastomer, and is more preferably composed of polyurethane. This latter has been found to be particularly suited to mimicking the sphincter of Oddi.

The specific composition of the electroconductive gel 16 is not believed to be critical to the utility of the present invention. Any gel which is sufficiently conductive to permit the proper operation of the electrosurgical tool 28 at the voltages and/or current rates conventionally employed for cannulating or cutting the tissue mimicked by the form 12. Conventional electrocardiogram (ECG) gel has been found to be particularly useful as the gel 16 in the practice of the present invention. Such gels usually include a salt disposed in an aqueous jelly. However, soap solution-based gels are also expected to be useful for this purpose. It is also understood that form 12 and, in particular, electroconductive gel 16 conducts electrical current from the electrosurgical tool through one or more ground or return path connections (not shown) in physical contact with the gel.

The way in which the electroconductive gel 16 is introduced into the pores 14 of the form 12 is not believed to be critical to the present invention. While the invention certainly contemplates the deposition of the gel 16 from a solution infused into the pores 14 of the form 12, as well as deposition by other techniques, the easiest and most direct way to dispose the gel 16 in the form 12 is simply to place the gel 16 on the outside of the form 12, and press the gel 16 (by hand or otherwise) into the pores 14 of the form 12. Any excess gel 16 can then be wiped from the outside of the form 12, if desired. Depending upon the gel 16 used, the pores 14 may not need to be completely filled with the gel 16 in order to make the form 12 cuttable with the electrosurgical tool 28. The best way to determine if a suitable amount of electroconductive gel 16 has been supplied is simply to attempt to cut the form 12 with the tool 28; if the tool 28 cuts the form 12 at a conventional current load associated with an actual patient, the amount of gel 16 is sufficient.

Figure 5:
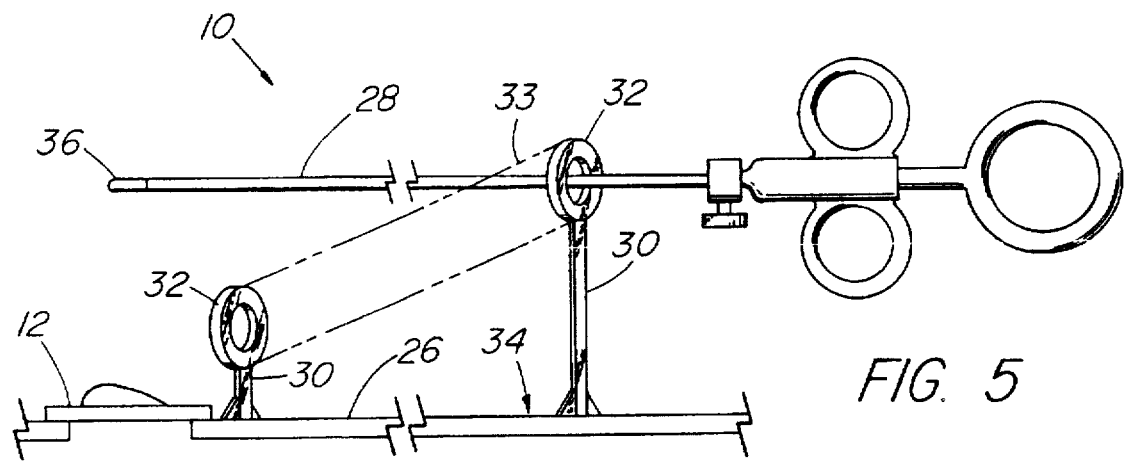
FIG. 5 is a perspective view of the preferred embodiment of the present invention during use.
Figure 6:
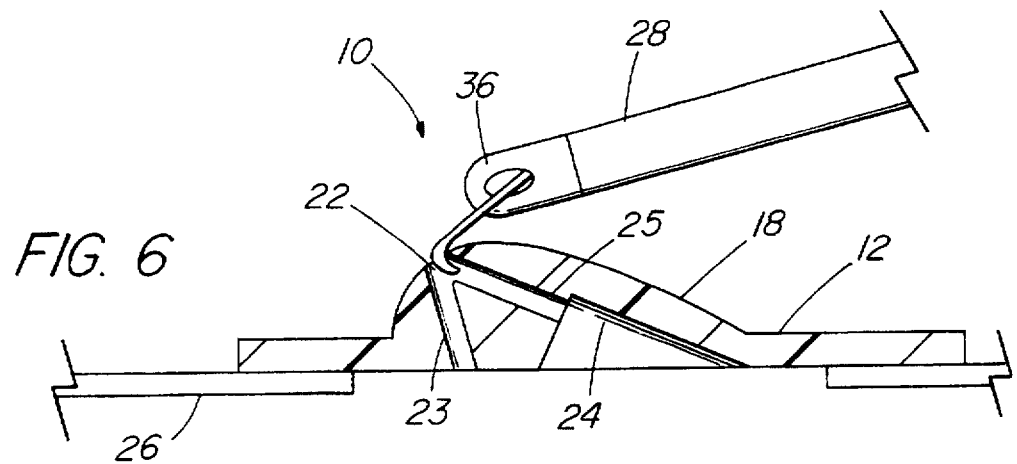
FIG. 6 is a partial cross-sectional view of the preferred embodiment of the present invention during use.

The apparatus 10, described thus far only as comprising the porous form 12 and the electroconductive gel 16 in the form 12, stands by itself as a complete device (that is, as a model) for training physicians in surgical techniques. However, the apparatus 10 can comprise additional elements which make it even more useful in such training. For example, as shown in FIGS. 5 and 6, the apparatus 10 can further comprise an electrosurgical tool 28 capable of cutting the form 12 when the electroconductive gel 16 is dispersed in the form 12. Preferably, the electrosurgical tool 28 is a sphincterotome or papillotome, and indeed can be the sphincterotome described in the '617 patent incorporated by reference herein.

The apparatus 10 can also further comprise a stand 34 establishing the position of the form 12 and restricting lateral movement of the electrosurgical tool 28 at one or more points along its length. The stand 34 allows the relative locations of the form 12 and the tool 28 to simulate the locations that would be encountered during the actual use of the tool 28 to cut the tissue mimicked by the form 12.

The stand 34 first comprises a base 26 to which the form 12 is fixed. The base 26 can be open behind the form 12, for example, behind the projection 18 representative of the papilla of Vater. The base 26 thereby establishes the position of the form 12, just as the position of the papilla of Vater is established by the remainder of the patient's body when readied for surgery. The stand 34 also comprises a means 30 for restricting lateral movement of the electrosurgical tool 28 at one or more points along its length. In this way, the range of movement available to the tool 28 during training more closely matches the range of movement which would be encountered during actual use of the tool 28. Preferably, the means 30 should mimic a body orifice or restriction through which the tool 28 would pass during its actual use. Accordingly, the means 30 is preferably formed as a loop(s) 32 connected to the base 26, through which the electrosurgical tool 28 passes. The loop(s) 32 is oriented to and spaced from the form 12 so as to mimic the orientation and spacing of the actual body orifice or restriction with respect to the sphincter of Oddi, or other subject tissue. Of course, the loop 32 could be replaced with a tube 33 (phantom lines) or even with a more comprehensive model or representation of the body; however, since the purpose of the invention is to provide the physician a familiarity with the cutting forces encountered in electrosurgery in an inexpensive way, such additional comprehensive models or representations of the body would appear to be superfluous. It is also understood that the training apparatus be configured to provide the physician with a similar feel, direction, tension, and orientation of the tool when practicing the technique.

Use of the apparatus 10 in surgical training is straightforward. A variety of electrosurgical tools and methods are well known, and the training provided by the present invention is most simply carried out by substituting the porous form 12 and electroconductive gel 16 for the actual tissue being cut in those methods, for example, in the methods disclosed in the '617 patent incorporated by reference herein. Knowledge of such substitution, taught herein, should be adequate to provide anyone skilled in this art with enough information to successfully use the present apparatus in teaching electrosurgical technique to physicians.

By way of summary, however, such training methods generally comprise: providing the form 12 having the electroconductive gel 16 disposed in it; fixing the form 12 to the base 26; passing the distal, operative tip 36 of the electrosurgical tool 28 through the restrictive means 30, for example, through the loop(s) 32 and/or tube 33; advancing the operative tip 36 of the tool 28 to the form 12; engaging the operative tip 36 of the electrosurgical tool 28 with the form 12, for example, by positioning the tip 36 adjacent to or in the orifice 22 leading to bile duct 25 in the projection 18; and actuating the electrosurgical tool 28 and cutting the form 12 with the operative tip 36 of the tool 28. Of course, this is only a general guide to the teaching of electrosurgical techniques; the specific steps of any training method will depend upon the particular surgical method to be taught, and upon the nature of the particular tissues to be treated. Anyone skilled in the art of instructing physicians in surgical techniques should easily be able to adapt these guidelines to the specific surgical techniques of interest, in view of the present disclosure.

The present invention thus provides an inexpensive model for the human and animal tissues in which sphincters are formed, which is highly advantageous in that it obviates the costs and limitations incurred when actual tissues are employed in training a surgeon in the use of electrosurgical tools, in particular, in the use of sphincterotomes and papillotomes. Practice in the use of such tools makes the surgeon more familiar with the degree of force necessary to advance the tools through the tissues to be cut, and more familiar with the degree of force necessary to actually perform the cutting of the tissue, as well as the tissue cutting rates and volumes encountered during cutting. This improves the surgeon's ability to control the tool during the surgical procedure, and thereby reduces the risk of injury or complication to the patient during such surgery.

Any undisclosed or incidental details of the construction or composition of the various elements of the disclosed embodiment of the present invention are not believed to be critical to the achievement of the advantages of the present invention, so long as the elements possess the characteristics needed for them to perform as disclosed. The selection of these and other details of construction are believed to be well within the ability of one of even rudimentary skills in this area, in view of the present disclosure.

Industrial Applicability

The present invention is useful in training physicians in the performance of surgical procedures, and therefore finds applicability in human and veterinary medicine.

It is to be understood, however, that the above-described device is merely an illustrative embodiment of the principles of this invention, and that other devices and methods for using them may be devised by those skilled in the art, without departing from the spirit and scope of the invention. It is also to be understood that the invention is directed to embodiments both comprising and consisting of the disclosed parts.

What is claimed is:

1. A surgical training apparatus (10), comprising:
    a porous, nonconductive form (12) having mechanical properties comparable to the mechanical properties of human or animal tissue in which a sphincter is located, and having a plurality of pores (14); and
    an electroconductive gel (16) disposed in the pores (14) of the porous form (12) in an amount adequate to permit cutting of the form (12) by an electrosurgical tool (28).

2. The apparatus (10) according to claim 1, wherein the form (12) is shaped comparable to and has mechanical properties comparable to the papilla of Vater.

3. The apparatus (10) according to claim 2, wherein the form (12) comprises an orifice (22) defined therein, the orifice (22) being dimensioned comparable to and thereby being representative of the sphincter of Oddi.

4. The apparatus (10) according to claim 1, wherein the form (12) comprises an orifice (22) defined therein, representative of the sphincter to be cut.

5. The apparatus (10) according to claim 1, wherein the gel (16) is pressed or infused in the pores (14) of the form (12).

6. The apparatus (10) according to claim 5, wherein the form (12) is composed of a foam.

7. The apparatus (10) according to claim 6, wherein the foam is a synthetic elastomer.

8. The apparatus (10) according to claim 6, wherein the foam is polyurethane.

9. The apparatus (10) according to claim 1, wherein the gel (16) is electrocardiogram gel.

10. The apparatus (10) according to claim 1, further comprising an electrosurgical tool (28) capable of cutting the form (12) when the electroconductive gel (16) is dispersed in the form (12).

11. The apparatus (10) according to claim 10, wherein the electrosurgical tool (28) is a sphincterotome or papillotome.

12. The apparatus (10) according to claim 10, further comprising a stand (34) establishing the position of the form (12) and restricting movement of the electrosurgical tool (28).

13. A surgical training apparatus (10), comprising:
a porous, nonconductive form (12) shaped comparable to and having mechanical properties comparable to the papilla of Vater, the form (12) comprising an orifice (22) defined therein, the orifice (22) being dimensioned comparable to and thereby being representative of the sphincter of Oddi, and the form (12) having a plurality of pores (14) and being composed of a polyurethane foam;

an electrocardiogram gel (16) disposed in the pores (14) of the form (12); and an electrosurgical sphincterotome or papillotome capable of cutting the form (12) when the electroconductive gel (16) is disposed in the pores (14) of the form (12).

14. A method of surgical training, comprising the steps of:
providing an apparatus (10) comprising: a porous, nonconductive form (12) shaped comparable to and having mechanical properties comparable to the papilla of Vater, the form (12) comprising an orifice (22) defined therein, the orifice (22) being dimensioned comparable to and thereby being representative of the sphincter of Oddi, and the form (12) having a plurality of pores (14) and being composed of polyurethane; an electrocardiogram gel (16) disposed in the pores (14) of the form (12); and an electrosurgical sphincterotome or papillotome capable of cutting the form (12) when the electroconductive gel (16) is disposed in the pores (14) of the form (12); and cutting the form (12) with the electrosurgical tool (28).

15. The method according to claim 14, further comprising establishing the location of the form (12) and restricting movement of the electrosurgical tool (28) before cutting the form (12).

* * * * *